Nov. 26, 1957  J. W. CROWNOVER  2,814,660
ELECTROSTATIC GENERATOR AND IGNITION SYSTEM
Filed July 21, 1955  3 Sheets-Sheet 1

INVENTOR.
JOSEPH W. CROWNOVER
BY
Attorney

Nov. 26, 1957     J. W. CROWNOVER     2,814,660
ELECTROSTATIC GENERATOR AND IGNITION SYSTEM
Filed July 21, 1955     3 Sheets-Sheet 2
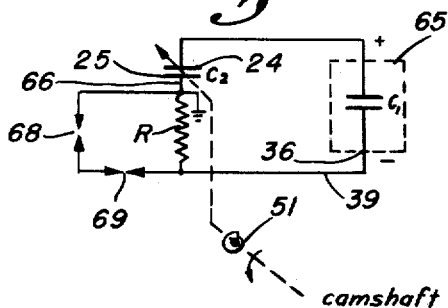
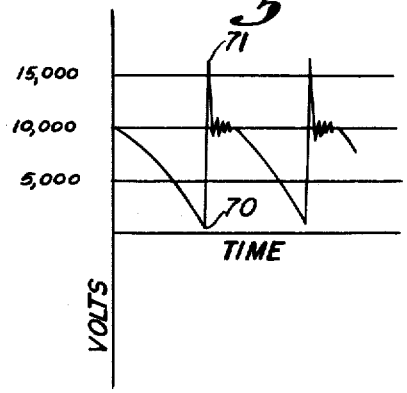
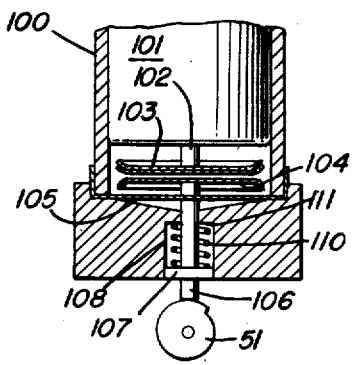
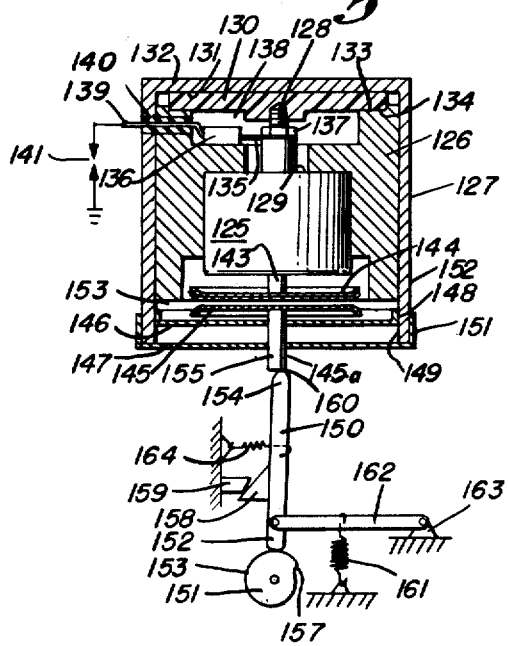
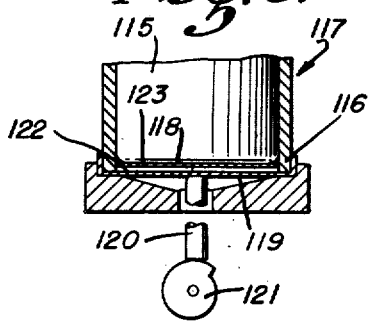
INVENTOR.
JOSEPH W. CROWNOVER
BY
Attorney

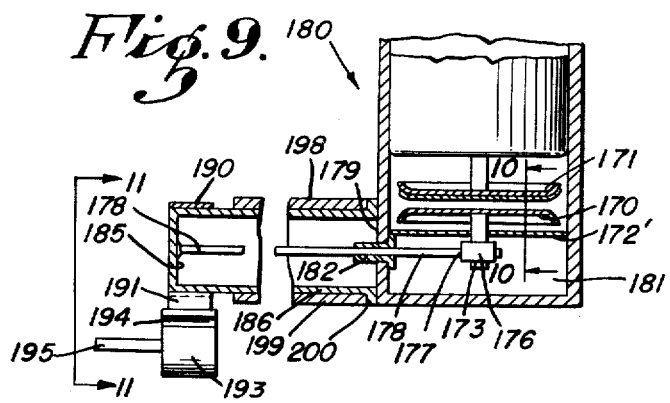
Fig. 9.
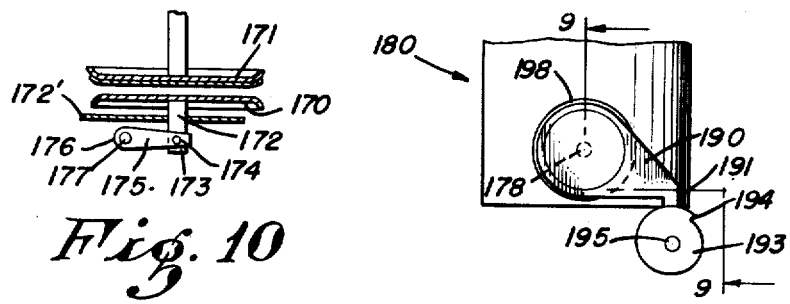
Fig. 10.
Fig. 11.

United States Patent Office 2,814,660
Patented Nov. 26, 1957

2,814,660
ELECTROSTATIC GENERATOR AND IGNITION SYSTEM

Joseph W. Crownover, Sherman Oaks, Calif.

Application July 21, 1955, Serial No. 523,448

24 Claims. (Cl. 123—148)

This invention relates to a high voltage electrostatic generator utilizing a capacitor or condenser in which one of the plates is moved relative to the other. The invention has a number of novel basic implications which will become clear in the course of the following detailed explanation. In this form of generator mechanical energy is converted to electrical energy by varying the capacity of the condenser. This in itself has been known to the prior art, wherein mechanical energy has been converted to electrical energy by moving one condenser plate relative to another. For example, this type of high voltage generator is shown in the patent to Giacoletto, No. 2,588,513. However, in this patent separate charging and discharging circuits are utilized and switch contacts are used both in the charging and discharging circuits. The invention herein involves the discovery that it is possible to convert mechanical energy into electrical energy and to produce a very high voltage pulse with only a very low voltage available without the use of switching contacts. This invention is based on the principle that after a condenser has been charged that if the plates are separated quickly, that is, if they are snapped apart, the reduced capacity will be accompanied by an increased potential between the plates, and that the potential is proportional to the rate or speed at which the plates are moved apart, in the particular circuit of this invention.

The invention is particularly useful in ignition systems whereby a high ignition voltage can be produced by the condenser with only a relatively low voltage source available. The invention adapts itself for this purpose, for example, in connection with internal combustion engines, since the engine is available as a source of mechanical energy for moving the condenser plates toward and away from each other, whereby the electrical energy necessary for ignition is converted from mechanical energy provided by the engine. It is another particularly significant aspect of the invention that its nature is such that it adapts itself to and makes possible the advantageous and convenient use of a radioactive battery as a source of potential. Using a radioactive battery, very high ignition potentials can be obtained and this application of a radioactive battery is made possible since, as pointed out, the actual energy for ignition is supplied as mechanical energy which is converted to electrical energy and there is virtually no energy drain from the battery. Radioactive batteries are now commercially available which are ideally adapted for this purpose. One particular radioactive battery which is readily available commercially is of a type which uses a solid rather than an air dielectric. This particular battery is considerably more satisfactory for the purpose, since it has a relatively steady voltage which reduces only in accordance with the half-life of the radioactive material. For example, the particular battery being described may have a potential of 10,000 volts and after a period of a good many years corresponding to the half-life of the radioactive material of the battery, its potential will still be 5,000 volts. In the earlier radioactive batteries, the potential would steadily increase until the air dielectric broke down, at which time there would be a discharge and a long period of waiting would be necessary before the potential of the battery again built up to a useful value.

A particular and significant feature of the invention as an electrostatic generator is that the invention does not utilize switch contacts, as pointed out above. In its most basic form, the condenser is charged and discharged through the same circuit. It is charged from a battery having a relatively low potential and in the basic circuit, the battery is in series with a spark gap, across which a spark is produced when the condenser plates are mechanically separated to reduce the capacitance and thereby proportionately increase the potential between the plates. The spark gap normally prevents leakage of charge from the condenser and upon discharge, the discharge is through the battery, after which the condenser is again charged by the battery.

One of the considerations in connection with the electrostatic generator of this invention is that for achieving a high voltage pulse. It is, of course, necessary that there shall not be breakdown of the dielectric between the condenser plates when they are moved close together. In connection with this, therefore, the invention in a preferred form provides that the condenser or capacitor is located within a gas chamber which increases the dielectric strength. This gas chamber utilizes a diaphragm as one wall thereof, and the gas pressure in the chamber is then utilized to move the diaphragm for the purpose of quickly moving or snapping one condenser plate away from the other. Thus, the snap movement of the condenser plate is achieved and at the same time the dielectric strength is kept high by reason of the gas pressure in the chamber. As pointed out in the foregoing, the change of capacity and similarly the rise in potential is dependent upon the rate of movement of the one condenser plate away from the other. Sufficient potentials can be achieved such as to cause discharge through the spark gap as described without the use of make and break contacts as in the prior art. It is possible, therefore, to achieve an ignition system having no contacting mechanism, that is, no breaker points, and at the same time one that is adapted to use with a radioactive battery as a source of potential.

One of the advantages realized by the invention in ignition systems is that the condenser can be snapped open at the precisely desired time for ignition in the timing cycle. That is, the voltage pulse is produced at the exact time the spark is needed for ignition; the ignition circuit remains complete and reliance is not had on breaker points and a distributor for producing the timed ignition pulse.

With reference to the prior art, it has been known to the prior art to provide an ignition system without contacting mechanism, that is, without breaker points utilizing a piezoelectric voltage source. In the patent to Harkness, 2,649,488, an ignition system is shown wherein a piezoelectric member is mechanically compressed to provide a voltage pulse which is used for ignition purposes. No contacting mechanism or breaker points are required. The invention herein provides the advantages both of the Harkness invention and that of Giacoletto wherein there is a movable condenser plate but separate charging and discharging circuits are utilized, each having a switch contacting mechanism.

In connection with the matter of maintaining a dielectric of considerable strength where the condenser is sealed in a pressure chamber, the matter of sealing, of course, becomes important, and this is particularly significant if a radioactive battery is used because it, of course, must be sealed against leakage also. By the use of a diaphragm as described, the need for rotary seals is eliminated in connection with the mechanism for transmitting mechanical force to the condenser plate for moving it. The arrangement as described, using a pressure chamber having a diaphragm as one wall thereof, provides a convenient means such that the condenser and the radioactive battery may be completely hermetically sealed. The invention features various ways of transmitting mechanical motion to the interior of the sealed chamber without the use of rotary seals, the chamber being at all times completely hermetically sealed.

This application is a continuation-in-part of my previously filed application Serial No. 424,050, filed April 19, 1954, now abandoned.

In accordance with the foregoing, it is an object of the invention to provide a high voltage electrostatic generator involving a condenser having a plate which is movable relative to the other plate and having means for snapping one plate away from the other.

Another object of the invention is to provide a method of producing high voltage pulses wherein a condenser plate is snapped away from another condenser plate to provide the pulse.

Another object of the invention is to provide a high voltage electrostatic generator as in the foregoing, wherein a low voltage source which may be a battery is provided for initially charging the condenser and the condenser is charged and discharges through the same circuit.

Another object of the invention is to provide a voltage generator as in the foregoing including a spark gap in the circuit which prevents charge from leaking off from the condenser.

Another object of the invention is to provide an electrostatic generator as in the foregoing, wherein the initial charge is provided by a radioactive battery.

Another object of the invention is to provide an electrostatic generator as in the foregoing, wherein the condenser is charged and discharges through a resistor and the spark gap is connected with the resistor.

It is another object of the invention to provide an electrostatic generator as in the foregoing wherein the condenser is within a sealed gas pressure chamber having a diaphragm forming one wall thereof which is adapted to be snapped in one direction as the one condenser plate moves relative to the other.

Another object of the invention is to provide an electrostatic generator as in the foregoing wherein the condenser and a radioactive battery are sealed within a gas pressure chamber having a diaphragm forming one wall thereof, which is adapted to snap in a direction to move one condenser plate relative to the other.

It is another object of the invention to provide an ignition system for an internal combustion engine wherein the source of potential is the electrostatic generator of the foregoing objects.

It is another object of the invention to provide a novel electrostatic ignition system for an internal combustion engine in which voltage varying capacitive means is employed and arranged to be reciprocated by an engine driven member to produce ignition voltages sufficiently large in magnitude to ignite a combustible charge.

It is another object of the invention to provide a novel electrostatic ignition system in which a radioactive electrical charging source is used in operative combination which variable capacitance means to produce ignition voltages considerably larger in magnitude than the supply voltage of said source.

It is another object of the invention to provide an electrostatic ignition system utilizing a novel variable capacitance circuit charged by radioactive battery means in which the capacitance of the circuit is caused to be rapidly charged to produce a high voltage discharge without causing dissipation of the total charge in the capacitive circuit.

It is another object of the invention to provide a novel electrostatic ignition circuit in which a spark gap circuit is employed in conjunction with a variable capacity circuit in such manner that maximum spark discharge voltage may be realized in the spark gap circuit without dissipating the electrical charge stored in the capacitive circuit.

It is anothter object of the invention to provide in an electrostatic type ignition system having a novel capacitive unit for producing ignition voltages novel gaseous pressure actuated means for rapidly separating the plates of the capacitor to produce high voltages, the gases also serving to prevent destructive electrical arcing across the plates of the capacitor.

It is a further object of the invention to provide in an electrostatic ignition system having a variable capacitance unit for producing ignition voltages, novel mechanical means for reciprocating the capacitive unit through cam actuated twisting mechanism adapted to produce rapid separation of the capacitor plate with the consequent production of ignition voltages.

Further objects and numerous advantages of the invention will become apparent from the following detailed description and annexed drawings wherein:

Fig. 4 is a circuit diagram illustrating the electrical components of the invention as adapted in Fig. 2;

Fig. 5 is a sectional view of a slightly modified form of actuating mechanism for the electrostatic generator;

Fig. 6 is a sectional view of another modified form of the invention illustrating a modified way of actuating the electrostatic generator;

Fig. 7 is a sectional view of another modified form of the electrostatic generator and a manner of actuating the condenser;

Fig. 8 is a graph of the voltage pattern produced by the electrostatic generator;

Fig. 9 is a sectional view of another modified form of the invention wherein alternative means for actuating the condenser plate are shown;

Fig. 10 is a sectional view taken along line 10—10 of Fig. 9;

Fig. 11 is a sectional view taken along line 11—11 of Fig. 9.

Figure 1:
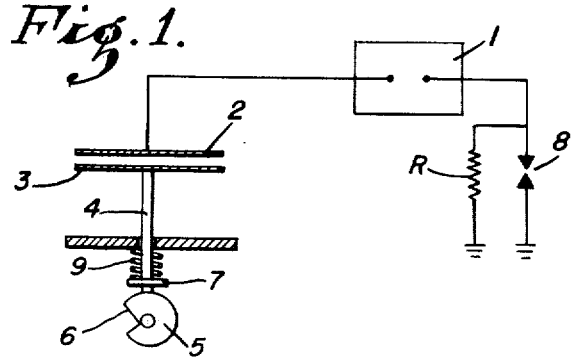
Fig. 1 is a diagrammatic circuit view of a basic form of the electrostatic generator of this invention.

Referring now more particularly to Fig. 1 of the drawings, this figure shows the electrostatic generator of this invention in its most basic form and involving the most basic circuit arrangement. In Fig. 1, the circuit includes a relatively low voltage source which is a battery 1 which has a certain internal capacitance. The electrostatic generator involves a condenser having a fixed plate 2 and a movable plate 3 which is adapted to be moved toward and away from the fixed plate 2. The plate 3 has an operating stem 4, the end of which, in the form of the invention as shown, rides on a cam 5, having a dwell forming an abrupt drop-off or shoulder as shown at 6. The stem 4 is normally biased by a spring 9 acting against a retainer 7 so that the stem 4 is normally urged against the cam 5. The fixed plate of the condenser 2 is connected to the battery 1 as shown and the other terminal of the battery is connected through a spark gap 8 to ground, as shown. Connected across the spark gap 8 is a resistor R. Resistor R permits charging of the condenser to a charge equal to that of the battery. The value of resistor R is sufficiently high that when the condenser voltage is increased it will discharge through the spark gap before the charge can leak off through the resistor.

From the foregoing, it will be observed that rotation of the cam will cause the plate 3 to be moved towards the plate 2 relatively slowly and it will be moved abruptly away from the plate 2, that is, in other words, it will be snapped away from the plate 2 at a rate depending upon the exact characteristics of the mechanical arrangement for snapping the plate 3. As the plate 3 is moved towards the plate 2, the capacitance of the condenser will be increased. The charge which is taken by the condenser will be equal to the charge on the battery 1. When the stem 4 drops off the abrupt shoulder 6, the plate 3 is abruptly moved away from the fixed plate 2, that is, it is snapped away from the plate 2. When this happens, the capacitance of the condenser is rapidly reduced and the voltage is correspondingly increased and the voltage is increased in proportion to the rate at which the plate 3 is moved away from the plate 2. The resulting voltage pulse is considerably greater than the voltage developed by the source 1 by a factor depending upon the characteristics of the components, the size of the condenser, the rate at which plate 3 is moved, etc. The voltage pulse produced across the condenser will be sufficient to cause a spark to jump across the spark gap 8, it being understood of course that the movable plate 3 is grounded. The flow of current will in effect be a flow of charge from the condenser back into the battery proportionate to the change in capacity of the condenser.

The effect in the circuit is that of an exchange of charge between the battery and the condenser and back again without actual drain of electrical energy from the battery. The actual energy is mechanical energy supplied by rotation of the cam 5. In other words, the exchange of charge is effected by reason of mechanical energy from the cam being converted into electrical energy; there is no actual electrical energy drain on the battery 1.

As previously pointed out, Fig. 1 illustrates a most basic form of the electrostatic generator of this invention and the most basic circuitry. The theory, function and operation of the invention will become better understood from the following description in connection with the more elaborate forms of the invention.

Figure 2:
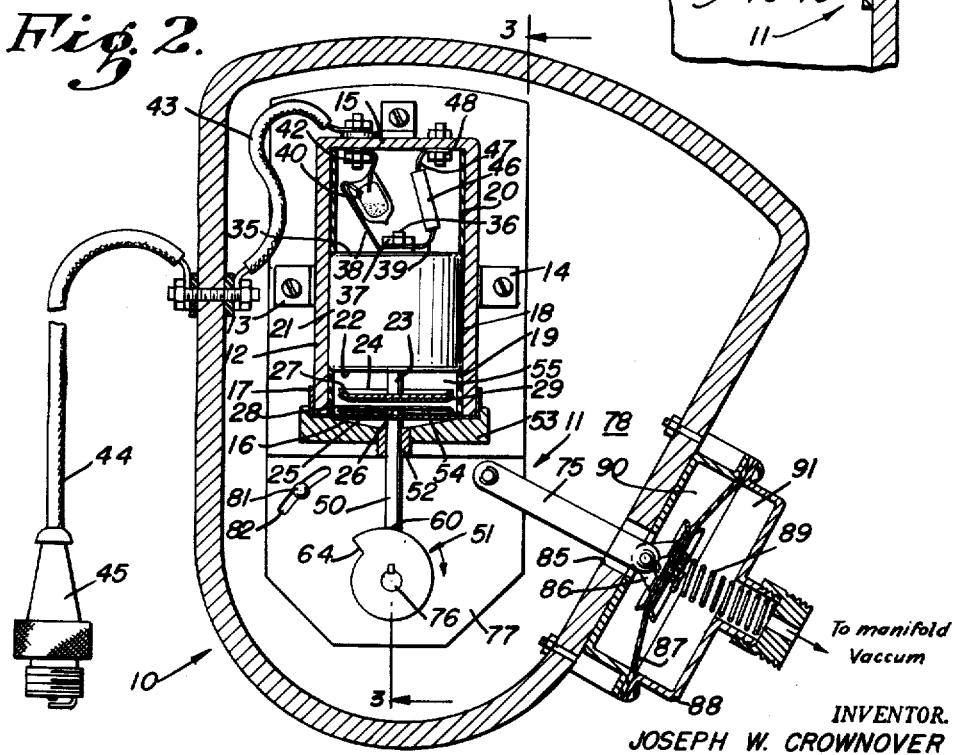
Fig. 2 is an elevational view in section of the electrostatic generator of this invention adapted for use in the ignition system of an internal combustion engine.

Referring now to the embodiment illustrated in Fig. 2, there is therein illustrated a housing 10 enclosing a rotatable support member 11 upon which is mounted a cylindrical metallic housing 12. The housing 12 is positioned in a slot member 11 and is rigidly clamped into place by side clamps 13 and 14. The housing 12 is closed at the upper end by wall 15 and at the lower end by the thin metallic diaphragm 16 having a skirt 17 which is rigidly joined to housing 12 in air-tight sealing engagement therewith. The diaphragm may comprise a metallic member having good fatigue properties in bending, such as beryllium copper, and is sufficiently thin to permit desired deflection thereof in an axial direction, with respect to the cylindrical housing 12.

Rigidly supported by inner wall 18 of housing 12 and between insulating spacer cylinders 19 and 20 is a source of voltage such as battery 21 in an insulating housing. The battery 21 preferably in this form of the invention comprises a radioactive unit, having the advantages of high voltage output, small size and long life. Such a battery is capable of generating high voltages for years, provided current drain is minimized. For example, if the isotope strontium 90 is used as the radioactive particle source, a battery initially developing 10,000 volts will be developing around 5,000 volts twenty-five years later since the half-life of the isotope is twenty-five years. Such batteries are now commercially available, are relatively inexpensive and may be made small in weight and size. One such battery utilizes a solid rather than a vacuum dielectric greatly facilitating reduction in size. The solid dielectric may be polystyrene, the resistance of which increases with time upon being irradiated with the result that the initial voltage may be realized over many years.

Projecting downwardly and outwardly from the lower end 22 by battery 21 is a co-axial stem-like terminal 23 to the end of which there is rigidly attached a transversely extending thin capacitor plate 24. A second capacitor plate 25 is positioned beneath plate 24 in close proximity thereto, the second plate being rigidly joined to a support 26 which is fastened to the inside surface of diaphragm 16. Plate 25 is grounded to housing 12 through the diaphragm 16. The two plates extend transversely into close circumferential proximity to the insulating cylindrical spaced 19 to provide a large capacitive plate area. The edges or rims 27 and 28 of the two plates may be turned away from one another, as shown, in order to minimize fringe capacitive effects.

The two plates are spaced closely together in order to bring the average capacitance thereof to the same order of magnitude as the internal capacitance of the radioactive battery. 21. The upper plate 24 has bonded thereto a thin layer 29 of a dielectric substance such as polystyrene having good insulating qualities and having a high dielectric strength, the purpose of the layer being to permit the movable plate 25 to be moved very close to plate 24 without shorting out the plates, electrically. In other words the combined air dielectric due to the spacing and the higher dielectric polystyrene permits achieving a high capacitance with smaller elements. In addition, the polystyrene dielectric layer provides limited shielding against radiation emanating from the battery, and therefore minimizes the possible ionizing effect of such radiation on the gas dielectric in the gap between layer 29 and plate 25.

Projecting from the upper end 35 of the battery is a second terminal 36 which is threadedly engaged by a nut 37 serving to retain the ends of conductors 38 and 39 in electrical contact with terminal 36. The opposite end of conductor 38 is electrically connected to a spark discharge unit such as the glass enclosed gas-filled unit 40. Conductor 41 connects the unit 40 to terminal 42 extending through and insulated from wall 15 of the housing 12. Insulated conductors 43 and 44 connect terminal 42 with spark plug 45. Conductor 39 comprises a wire lead of a resistor 46, the opposite wire lead 47 of which is grounded at terminal 48 likewise passing through upper end wall 15 of the housing, but grounded thereto.

The diaphragm 16 and lower plate 25 are moved upwardly toward upper plate 24 by means of a push rod 50 and rotating cam 51. The push rod 50 is supported vertically by a bushing 52 carried in an aperture in disc-shaped end cap 53 which is rigidly fastened to skirt 17. The upper end of the push rod is arranged to bear against the center portion of the lower or outer side of the diaphragm 16. The inner surface 54 of the end cap is dished downwardly to a slight extent, as shown, in order to provide a supporting surface for the diaphragm when it is deflected downwardly. The diaphragm is normally urged downwardly against surface 54 by gas pressure within the chamber 55 surrounded by housing 12. High gaseous pressures within chamber 55 are utilized for several reasons. Firstly, the pressure exerted on the diaphragm serves to urge the diaphragm downwardly at all times and therefore supplies the force required to snap the plate 25 away from plate 24 to effect the production of high voltage, as explained below. Secondly, the existence of high gaseous pressures in chamber 55 permits plate 24 to be moved closer to plate 25 to increase the capacitance of the plates, without electrical breakdown since the voltage gradient across the gap between the plates at which electrical breakdown occurs is substantially raised by the high gas pressures. The desirability of momentarily maximizing the capacitance of the plates by moving them so closely together as possible is seen when it is realized that by doing so a higher voltage difference may be developed across the plates, after they are snapped apart. Thus, to realize a certain maximum voltage when the plates are snapped apart, the plates 24 and 25 may be made conveniently small in diameter provided they can be initially moved very closely together, and the latter condition can be satisfied by providing appropriately high gaseous pressures within chamber 55.

The lower end 60 of push rod 50 bears against the outer surface 61 of cam 51. The surface 61 is of such a shape as to force push rod 50 upwardly to move plate 25 slowly toward 24, and after the desired gap between the plates has been reached, to unload the push rod 50 so that plate 25 may snap downwardly away from plate 24. Thus the cam surface may be spiral shaped, with a sudden step or shoulder 64 provided to enable the lower end 60 of push rod 50 to drop downwardly.

The equivalent electrical circuit of the ignition system is illustrated in Fig. 4. The circuit includes high voltage type radioactive battery 65 having an internal capacitance $C_1$ connected in series with resistor R and capacitor $C_2$ by means of conductor 23 between the positive terminal of the battery and fixed plate 24 of the capacitor $C_2$, conductor 39 between the negative terminal of the battery and the resistor R, and conductor 66 between resistor R and the movable plate 25 of the capacitor. It is within the scope of the invention that a voltage source other than radioactive battery 65 be used. The latter conductor represents the grounded structure of Fig. 1, including terminal 48, housing 12, end cap 23, diaphragm 16, and plate support 26.

Connected in parallel with resistor R are series connected spark gaps 68 and 69, the former corresponding to spark plug 45 in Fig. 2, and the latter corresponding to the spark discharge unit 40.

The operation of the diaphragm type electrostatic ignition system may be understood from a consideration of the circuit shown in Fig. 4. The capacitance of the condenser $C_2$ is caused to change rapidly by reciprocation of the lower or movable plate 25 toward and away from fixed plate 24. Initially, before such reciprocation, the plates of capacitor $C_2$ are at rest and are electrically charged by battery 65 to a potential equal to the potential across the equivalent capacitor $C_1$ in the battery. As movable plate 25 is moved slowly toward fixed plate 24, the capacitance of $C_2$ is increased, and condenser $C_1$ shares its charge with condenser $C_2$. Thus, current flows through the circuit and hence through resistor R. The potential drop across R depends upon the amount of current flowing through R, which in turn depends upon the time rate of change of capacitance of $C_2$.

When movable plate 25 of condenser $C_2$ is snapped away from fixed plate 24, the capacitance of $C_2$ is decreased, the current flowing through resistor R is reversed, and the charge flows back into condenser $C_1$. The system constantly strives to reach the static state in which the charges are divided in proportion to the capacity.

It will be noted that after $C_2$ has returned to its original capacity, the entire exchange of charge between the two condensers $C_1$ and $C_2$ has for all practical purposes added or subtracted nothing to or from the initially stored electrical energy in the condensers, because charge flowing between the battery 65 and fixed plate 24 is not dissipated through any resistance other than the extremely low resistance of short conductor 23. The energy dissipated in the resistor R is entirely supplied by the mechanical force which moves plate 25.

The result of the interchange or charge between the two condensers is a varying potential across R having a frequency equal to the frequency of movement of movable plate 25. The amplitude of the varying potential depends upon the amount of static charge originally supplied to condensers $C_1$ and $C_2$ by the radioactive battery 65 and also upon the rate at which plate 25 moves toward or away from plate 24. However, should the reciprocation frequency of plate 25 exceed the so-called relaxation frequency of the circuit, the condenser system $C_1$ and $C_2$ will have insufficient time in which to complete the intercharge of charge between $C_1$ and $C_2$ before a reversal of current flow is begun. The relaxation frequency of the present circuit is defined as $$fr = (1 + C_1/C_2)/RC_1$$

In general, the maximum voltage drop across the resistor R will occur when the frequency of reciprocation of plate 25 approaches very nearly the relaxation frequency $fr$ of the circuit. Thus, the values of $C_1$, $C_2$ and R should be such as to give a relaxation frequency greater than the reciprocation frequency of plate 25 at maximum engine speed.

Referring again to the circuit in Fig. 4 and to Fig. 2, and commencing from the time when plate 25 is furthest from plate 24, plate 25 is moved toward plate 24 by slow rise cam surface 61 and push rod 50. The capacitance of $C_2$ is increased at a rate slow enough at maximum engine speed to permit charge to flow from $C_1$ to $C_2$ with substantially no time lag, that is, with the respective charges on $C_1$ and $C_2$ being in equilibrium. When $C_2$ reaches a maximum value, the potential across $C_2$ is considerably decreased as indicated by point 70 in Fig. 8. Thereafter, the end of push rod 50 drops off the stepped shoulder 64 of cam 51, and gas pressure in chamber 55 snaps diaphragm 16 downwardly, carrying the plate 25 away from plate 24 at an extremely rapid rate. In other words, the capacitance of $C_2$ is suddenly decreased, causing the voltage across $C_2$ to suddenly rise before the charge on $C_2$ can flow off $C_2$ through R to $C_1$. Peak voltage is shown at point 71 in Fig. 8. This circumstance causes a high potential to exist across R and hence across the spark gaps 68 and 69. The air or other gas within the spark gaps will ionize when ionization, potentials are reached, and a spark will jump the gaps 68 and 69 permitting the charges on $C_2$ and $C_1$ to come to an immediate state of equilibrium before all but a very small amount of electrical energy can be dissipated in resistor R.

For this to occur, the time constant $RC_2$ of the resistor R and condenser $C_2$ combination must be substantially greater than the length of time for plate 25 to move away from the plate 24, in order that current will not leak through resistor R in an amount great enough to appreciably lessen the high voltage.

One function of the spark discharge unit 40 in Fig. 2 is to prevent current leakage between the negative terminal 36 of the battery and spark plug 45 prior to spark discharge across both the discharge unit 40 and the plug 45. This permits the resistor R to be the sole resistive component determining the $RC_2$ time constant. The resistance of R is, of course, much greater than the effective resistance of the spark gaps 68 and 69 in Fig. 4. The spark discharge unit 40 is enclosed in a glass tube in order that the high pressures existing within housing 12 will not effect the discharge resistance of the spark gap. Unit 40 may comprise a small mercury discharge tube.

The voltage required to bring about spark discharge across spark plug 45 ordinarily will be between 5,000 and 10,000 volts. The resistance of the control gap 69 or discharge unit 40 should be such as to permit arcing thereacross at lesser voltages than are required to cause arcing to the spark plug. Therefore, values of $C_1$, $C_2$, R, and the open circuit voltage across the radioactive battery must be such as to give the required 5,000 to 10,000 volt drop across R at all engine speeds. With a 10,000 volt open circuit voltage across battery 65, and a tenfold capacitance increase of $C_2$ as plate 25 is moved toward plate 24, the voltage across $C_2$ drops considerably under 5,000 volts, as shown in Fig. 8. When plate 25 is thereafter snapped away from plate 24, the voltage will be suddenly increased until spark discharge across gaps 68 and 69 occurs. With a sufficiently large value of resistor R to give a sufficiently great $RC_2$ time constant, the voltage developed across R may be made to exceed 15,000 volts, as shown in Fig. 8, which voltage is more than adequate to bring about spark discharge across gaps 68 and 69.

Figure 3:
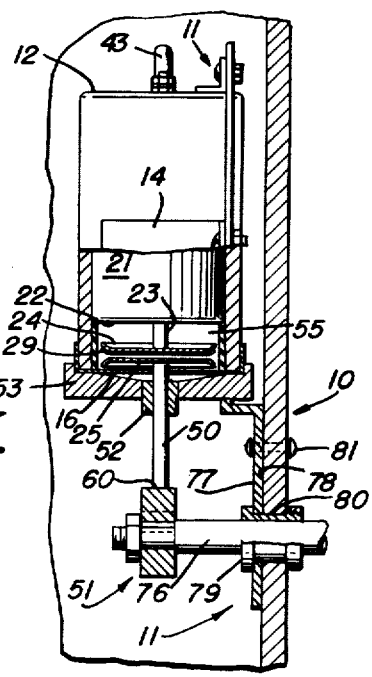
Fig. 3 is a sectional view taken along line 3—3 of Fig. 2.

Referring to Figs. 2 and 3, it will be seen that means is provided for adjusting the timing of ignition with respect to the absolute angular position of cam 51, for more efficient engine operation. A link member 75 is pivotally connected to rotatable support member 11 in such a manner as to urge member 11 clockwise or counterclockwise about the axis of rotation of shaft 76, to which cam 51 is keyed. Member 11 includes a flat portion 77 held flatly but loosely against flat inner surface 78 of housing 10 by flange 79 of bushing 80, and by rivet 81. Rivet 81 passes through a slot 82 in portion 77 which lies along an arc of a circle the center of which is coincident with the axis of shaft 76. This construction enables support member 11 carrying the ignition unit to pivot guidely about the axis of shaft 76, thereby permitting ignition timing to be changed with respect to the absolute angular position of cam 51.

Link 75 passes through an aperture 85 in housing 10 and is connected to bracket 86 carried by diaphragm 87. The latter is carried within a housing 88 attached to housing 10. The diaphragm is urged toward aperture 85 by a compression spring 89. Chamber 90 on one side of the diaphragm is normally connected to the atmosphere, while chamber 91 on the opposite side is connected to the engine manifold by suitable ducting. When manifold vacuum increases, the diaphragm is sucked rightwardly to urge link 75 rightly and to carry the ignition system support member 11 in a clockwise direction about the axis of camshaft 76. Thus, the unloading of push rod 50 off shoulder 64 of the cam will be retarded, and ignition will be delayed. Conversely, for lower manifold vacuum, ignition timing will be advanced.

Referring now to the modified embodiment shown in Fig. 5, the housing 100, battery 101, terminal 102, plates 103 and 104, and diaphragm 105 are the same as corresponding elements in Figs. 2 and 3. Spring means are provided in place of gas pressure in chamber 55 for snapping the plates 24 and 25 apart. The push rod 106 has a flange 107 formed thereon, the latter engaging the wall 108 of cylindrical aperture formed in end cap 109 and serving as a guide for push rod 106 during reciprocation thereof. A compression spring 110 is inserted between flange 107 and shoulder 111 formed in end cap 109 in order to urge the push rod downwardly into engagement with cam 51. The operation of the device illustrated is substantially the same as operation of the device shown in Fig. 2.

Referring to Fig. 6, in which a simplified form of the invention is illustrated, the radioactive battery 115 is positioned very close to the lower end 116 of housing 117, so that the base 118 of the battery lies in close proximity of the diaphragm 119. The base 118 constitutes the fixed plate of the variable condenser, while the diaphragm 119 constitutes the movable plate of the condenser. Diaphragm 119 is reciprocated by the push rod 120, which engages cam 121, and by gas pressure within chamber 122 between the diaphragm and the base 118 of the battery, as previously described in connection with Fig. 2. A thin layer 123 of a dielectric substance such as polystyrene, having good insulating properties, is bonded to the base 118 of the battery to provide a means for precluding electrical short circuiting between diaphragm 119 and the base 118 of the battery when the voltage gradient across the gap therebetween is at a maximum level. The layer 123 also precludes actual contact of diaphragm 119 with base 118 should misalignment between the cam 121 and housing 117 occur.

Referring to Fig. 7, another modified form of the ignition system is illustrated therein. The radioactive battery 125 is partially enclosed within a lead or other type radiation shield 126, which is in turn enclosed within thin walled housing 127. The negative terminal 128 of the battery projects upwardly from the upper end 129 of the battery and threadedly engages a disc-shaped resistance block 130, corresponding to resistor R in Fig. 4. The upper surface 131 of the block seats against the upper end wall 132 of housing 127, and an annular surface 133 of the block seats in an annular groove 134 formed in the shield 126. The block 131 may comprise a high resistance substance such as a carbon filled phenolic of a certain ratio of such shape as to provide an equivalent resistance of the required value.

One lead 135 of a small gas discharge tube 136 is fastened to terminal 128 by means of nut 137. The tube is positioned within chamber or cavity 138 between shield 126 and resistance block 130. The opposite lead 139 of the tube is led out through the walled housing through tubular insulator 140, and is connected to spark plug 141 as schematically shown.

The positive terminal 143 of the battery, fixed capacitor plate 144 and reciprocable plate 145 are formed and positioned in the same manner as corresponding elements in Fig. 2. Plate support rod 145a, to the upper end of which plate 144 is attached, is supported and aligned by two diaphrags 146 and 147, which lie in parallel planes perpendicular to the axis of the push rod. The skirt 148 of inner diaphragm 146 is rigidly and hermetically sealed to the inside wall 149 of the lower portion 150 of housing 127, while skirt 151 of the outer diaphragm 147 is rigidly supported by the outer wall 152 of portion 150 of the housing. Gas under pressure fills chamber 153 surrounding the two plates 144 and 145 and serves to exert an outwardly directed force on inner diaphragm 146, urging the diaphragms 146 and 147 and plate 145 downwardly and away from fixed plate 144. The two diaphragms may comprise thin metallic discs capable of a certain degree of flexure or bending to allow vertical movement of rod 145. The two diaphragms also serve to keep the support rod vertically aligned since the diaphragms are mounted in parallel planes. Rod 145a must be kept vertically aligned in order to keep movable plate 145 parallel to fixed plate 144.

Plate support rod 145a is urged vertically upwardly to move plate 145 toward plate 144 during operation of the ignition device by means of push rod 150 and cam 151. The lower end 152 of push rod 150 engages the rotating surface 153 of the cam, while the upper end 154 of the rod engages the lower end 155 of support rod 145a. Push rod deflecting means is provided for moving the upper end 154 of the push rod out of contact with the lower end 155 of support rod 145a shortly before the lower end 152 of push rod 150 drops off the shoulder 157 of the cam. The deflecting means includes a sear 158 projecting angularly and laterally from one side of the push rod so as to operatively engage a fixed lug 159 projecting toward the sear.

The sear engages the lug in sliding contact as the push rod 150 is moved vertically, and the angular slope of the sear is sufficient to deflect the upper end 154 of the rod sufficiently to drop off or clear the side 160 of the support rod 145a by the time the movable plate 145 has been brought into desired proximity to fixed plate 144. When disengagement occurs, the gas pressure behind diaphragm 146 snaps the diaphragm, support rod 145a and plate 145 downwardly as described in connection with Fig. 1. Shortly thereafter, the lower end 152 of push rod 150 drops off shoulder 157 of the cam 151, and the push rod is immediately pulled downwardly by tension spring 161. The latter is attached to a pivoted link 162, one end of which swings about fulcrum 163, and the opposite end of which is pivotally attached to the lower end of rod 150 to guidedly support the same during movement thereof. A second spring 164 is attached to rod 150 in such manner as to urge the sear 158 into contact with lug 159 at all times, and also to bias the upper end 154 of the rod 150 toward a position of alignment beneath support rod 145a.

One beneficial result accruing from use of the push rod deflecting means in operatively disengaging the push rod and associated mechanism from the support rod 145a is to minimize the mass subject to snap action acceleration when the gas pressure within chamber 153 acts to snap the diaphragm 146 downwardly.

By thus minimizing the mass of the mechanism subject to such movement, the snap action acceleration and velocity of plate 145 will be correspondingly increased, with the result that the voltage build-up across the plates 144 and 145 of the variable condenser will be maximized.

One of the key problems in the type of electrostatic generators of this invention is that of hermetic sealing particularly when a radioactive battery is used. The leakage resistance must be kept high. The reciprocating diaphragm type generator of this invention facilitates this purpose. The mechanical arrangement of the unit is such that the leakage resistance is kept optimum. The terminal of the battery is not contacted in any way. As explained in the foregoing the voltage or electrostatic effect is released through a condenser in an air or gas chamber. The assembled condition of the parts is such that no moisture or dirt can come in contact with the high voltage terminal of the battery causing it to be discharged. The form of the invention described below is one that facilitates the above purposes, particularly sealing and the transmission of operating forces through the pressure barrier formed by the high pressure chamber.

Referring now to Figs. 9, 10, and 11, novel means are provided for moving the movable plate 170 of the variable capacity away from fixed plate 171. The movable plate 170 is mounted on a short member such as stub shaft 172, the lower end 173 of which is pivotally attached to one end 174 of short link 175 extending at right angles to shaft 172. A diaphragm system 172' is provided to facilitate the continuance of a parallel state between plates 170 and 172 throughout their relative excursions. The opposite end 176 of link 175 is affixed to the end 177 of an elongated shaft 178 and pivots about the axis of shaft 178 as the latter rotates. Shaft 178 extends through the side wall 179 of the housing 180 enclosing pressurized chamber 181 in which the plates 170 and 171 are positioned. The shaft 178 is rotatably supported by bushing 182 extending through wall 179.

The opposite end of shaft 178 is rigidly attached to the outer end wall 185 of small diameter tubular housing 186, the axis of the latter extending at right angles to the axis of housing 180. The opposite end of the tubular housing 186 is rigidly attached and hermetically sealed to the side wall 179 of housing 180. Tube 186 is sufficiently thin walled to undergo a certain amount of angular displacement or twist when the outer end 187 thereof is twisted, such twist being resilient and within the elastic range of the material used. The angular twist is provided by arm 190 which is circumferentially joined to the outer end 187 of the tube 186, and projects outwardly in a generally radial direction with respect to the axis of the tube. The outer end 191 of the arm 190 is formed in the shape of a shoulder to ride on the surface 192 of cam 193, and to permit the shoulder to drop downwardly off the cam shoulder 194 upon rotation of the cam.

The operation, upon rotation of camshaft 195, the slow rise cam surface 192 engaging shoulder 191 causes the latter to move generally circumferentially with respect to the axis of tube 186. The arm 190 imparts twist to the outer end 187 of the tube 186, such twist being resisted by the torsional rigidity of the tube, which in turn depends upon the length of the tube, the diameter of the tube, and the wall thickness thereof. The total net twist or angular displacement of the outer end 187 of the tube is imparted to the shaft 178, which rotates freely an equal angular amount. Rotation of shaft 178 imparts rotation to link 175 about the axis of shaft 178, thereby moving plate 170 toward fixed plate 171 along a circumferential path. Link 175 may be made long enough to minimize the angular rotation of the plate 170 as it approaches or recedes from plate 171, in order to minimize anomalies in the change of capacitance brought about by such plate rotation.

When shoulder 91 on arm 190 drops off cam shoulder 194 the positive resilient twist previously imparted to tube 186 is suddenly released, and causes a sudden reverse twisting of the tube 186 to snap plate 170 away from plate 171, giving rise to the large voltages as heretofore described. The tube 186 is supported and guided in its rotation by the supporting tube 198, the inner wall of which slidably engages the outer wall of tube 186. One end 199 of tube 198 is fixedly attached to flange 200 of tube 186.

The structure shown in Figs. 9, 10, and 11 permits a reciprocating movement to be imparted to plate 170 with a minimum of structure attached to the plate 170 required to be accelerated. In other words, the rotational inertia of shaft 178 subject to angular acceleration may be minimized by making the diameter of shaft 178 very small. This can be done because the masses of the plate 170, shaft 172 and link 175 are very small. Thus, snap action of plate 170 away from plate 171 is quickened, resulting in the production of larger voltages across the plate.

Another beneficial result accomplished by the arrangement in Figs. 9, 10, and 11 lies in the substitution of relatively thin-walled, pressure withstanding housings 180 and 186 for the relatively thin diaphragm as shown in Fig. 2. High gas pressures within chamber 181 and chamber 203 enclosed by housing 186 may be used, since the wall members enclosing the chambers are relatively thicker, and yet the requirement that plate 170 be reciprocated is still satisfied. Higher gas pressures within chamber 181 permit plate 170 to be moved closer to plate 171 without electrical breakdown between the two, as described heretofore.

In the form of the invention shown in Fig. 9 the manner of operating the condenser avoids the need of high operating forces in transmitting movement through the pressure barrier. That is rotary movement of shaft 178 is not impeded by pressure in chambers 180 and 181.

From the foregoing, it will be observed that my invention provides a novel electrostatic generator wherein high voltage pulses may be produced using a relatively low voltage source and that there is virtually no energy drain on the low voltage source. The low voltage source may in one form of the invention, be a radioactive battery. The electrostatic generator utilizes no switch contacts and the high voltage pulse is proportional in magnitude to the rate at which one condenser plate is snapped away from the other. Preferably, the condenser, that is, the generator, is sealed in a high pressure chamber which achieves a higher dielectric constant and this chamber embodies a diaphragm which is snapped outwardly for moving one plate away from the other. As has been demonstrated, the invention is ideally adapted for use in connection with an ignition system for internal combustion engines. When a radioactive battery is used electrical leakage from both the battery and the electrostatic generator is minimized by having both in the sealed gas pressure chamber and in close proximity.

It will be apparent to those skilled in the art to which my invention pertains that various modifications and changes may be made therein without departing from the spirit of my invention or from the scope of the appended claims.

I claim:

1. The method of deriving a high electrical potential, said method comprising the steps of relatively slowly moving a condenser plate towards another condenser plate, charging the condenser formed by said plates from a relatively low voltage source, producing a relatively high potential between said plates by physically snapping the plates while maintaining the condenser in circuit relationship with the low voltage source apart and discharging said relatively high potential through a discharge circuit.

2. The method of claim 1, including discharging said relatively high potential through a discharge circuit which has a branch in parallel with a component of the charging circuit.

3. An electrostatic generator comprising a first condenser plate, a second condenser plate, means for moving said plates into a position relatively close together, means for charging the condenser formed by said plate, means for snapping said plates apart to achieve a relatively high potential, circuit means whereby said relatively high potential between said plates discharges, and the charging circuit and discharge circuit being of such characteristic that they remain continuously in circuit relationship with said condenser plates during the cycle of movement of the plates.

4. In an electrostatic generator, in combination, means forming a condenser plate, a second condenser plate, means for rapidly moving one of said plates away from the other, said last means comprising a pressure chamber comprising a diaphragm and having pressure therein enclosing said condenser plates, means for mechanically moving said diaphragm inwardly and for rapidly moving said diaphragm outwardly whereby the pressure in said chamber assists said diaphragm, causing it to move rapidly outwardly.

5. The invention as set forth in claim 4 wherein said means for moving said movable plate toward and away from said fixed plate includes a member subject to angular twist operative to impart said movement to said movable plate, and a cam for imparting angular twist to said member.

6. An electrostatic generator comprising a first condenser plate, a second condenser plate, means for moving said plates into a position relatively close together, means for charging and discharging the condenser formed by said plates including a circuit having a resistance element therein in series and a circuit element connected in parallel with said resistance element whereby said condenser charges through said resistance element, and means for snapping said plates apart to achieve a relatively high potential between the plates, the said resistance element and circuit element having such relationship that the condenser discharges through the circuit element.

7. The structure of claim 6 wherein said condenser plates are enclosed within a pressure chamber to increase the dielectric strength between the condenser plates.

8. The structure of claim 6 wherein one of said plates has a solid dielectric member carried thereby, the plates when in a position closest together having both a gas and a solid dielectric therebetween.

9. The structure of claim 6 wherein said condenser plates are enclosed within a pressure chamber having a diaphragm forming one wall thereof, said diaphragm being adapted to be moved with a snap movement for operating one of the said condenser plates.

10. In an ignition system: a variable capacitor having a movable plate and a fixed plate; means for moving said movable plate toward and away from said fixed plate; means forming a circuit for imparting an electrical charge to said capacitor plates; a resistor electrically connected in series in said circuit with said capacitor and said charge imparting means, said circuit being continuous during the cycle of movement of said movable plate; and a spark discharge ignition circuit electrically connected in parallel with said resistor whereby a spark discharge may be produced in said spark discharge ignition circuit in timed relaton to the movement of said movable plate.

11. The invention as set forth in claim 10 wherein said means for imparting an electrical charge to said capacitor plates includes a radioactive battery having an emitter electrode and a collector electrode, said collector electrode having a portion comprising the fixed plate of said capacitor.

12. In an internal combustion engine of the reciprocating type wherein the reciprocation of a piston within a cylinder turns a crankshaft, said engine having a spark plug, means for firing the plug including: a variable capacitor having a fixed plate and a movable plate; means for imparting movement to said movable plate in timed relation to the reciprocation of said piston; radioactive battery means for imparting an electrical charge to the fixed plate of said capacitor; a resistor electrically connected in series with said battery; and means for electrically connecting said spark plug across said resistor, whereby firing of said spark plug is brought about by turning of said crankshaft.

13. The invention as set forth in claim 12 wherein said means for moving the plate includes a push rod operatively connected between the plate and the cam, and a spring member for urging the push rod into pressural engagement with the cam.

14. The invention as set forth in claim 12 wherein said means for urging the plate toward the cam includes a flexible diaphragm operatively connected to the movable plate, and a confined gas exerting pressure on said diaphragm for urging said diaphragm toward the cam.

15. The invention as set forth in claim 12 wherein said means for imparting movement to said movable plate includes an engine driven cam operative on rotation to move said movable plate toward said fixed plate, means operative on rotation of said cam to allow rapid movement of said plate toward said cam, and means for urging the movable plate toward said cam, whereby ignition voltages may be produced across said resistor.

16. The invention as set forth in claim 15 wherein said means for allowing rapid movement of said plate toward said cam includes a stepped shoulder on the cam, and a cam surface engaging member arranged to effect movement of said plate in accordance with the profile of said cam surface, said member being adapted to drop off said stepped shoulder on rotation of said cam to impart rapid movement to said plate.

17. The invention as set forth in claim 15 wherein said means for allowing rapid movement of said movable plate toward said cam includes a first member operatively connected with said plate, a push rod having a laterally deflectible end in abutting engagement with the end of said first member and operative on rotation of said cam to effect movement of said plate in accordance with the profile of said cam, and deflecting means in operative engagement with said push rod to disconnect said abutting engagement on movement of said push rod to allow rapid movement of said plate and first member toward said cam.

18. In an ignition system: a variable capacitor having a fixed plate and a movable plate, means for imparting reciprocatory movement to said movable plate toward and away from said fixed plate; means for imparting a high voltage electrical charge to said capacitor, said means including a radioactive battery having a positive terminal electrically connected to said fixed plate and a negative terminal; a resistor electrically connected between said negative terminal and said movable plate; and a spark discharge type ignition circuit electrically connected in parallel with said resistor, whereby spark ignition may be brought about in timed relation with movement of said movable plate away from said fixed plate.

19. The invention as set forth in claim 18 wherein said spark discharge ignition circuit includes a spark plug connected in series with a spark gap device, said device being positioned near the connection means between said negative terminal and said resistor, whereby current leakage through said spark discharge circuit may be precluded before or after spark discharge.

20. The invention as set forth in claim 18 wherein said resistor and capacitor combine to provide an RC time constant smaller in magnitude than the period of reciprocation of said movable plate.

21. The invention as set forth in claim 18 including means for moving said movable plate away from said fixed plate in a time interval less than the RC time constant of said resistor and variable capacitor, whereby a high voltage spark discharge may be effected through said spark discharge ignition circuit.

22. The invention as set forth in claim 18 wherein said means for moving said movable plate away from said fixed plate comprises a member operatively connected to said movable plate and a compression spring engaging said member for urging said member and said plate in a direction away from said fixed plate.

23. The invention as set forth in claim 18 wherein said means for moving said movable plate away from said fixed plate comprises a flexible diaphragm operatively connected to said movable plate and a confined gas exerting pressure on said diaphragm for urging said diaphragm and said plate in a direction away from said fixed plate.

24. In an ignition system: a radioactive battery for having a voltage output of the order of magnitude of ignition voltages to be produced; a variable capacitor having a fixed plate electrically connected to the collector electrode of said battery, and a movable plate; means for moving said movable plate toward and away from said fixed plate; a resistor electrically connected in series with said battery; and a spark discharge type ignition circuit electrically connected in parallel with said resistor, whereby a spark discharge may be produced in said ignition circuit in time relation to movement of said movable plate.

References Cited in the file of this patent
UNITED STATES PATENTS

| | | |
|---|---|---|
| 1,559,656 | Thorp | Nov. 3, 1925 |
| 2,281,115 | Semonsen | Apr. 28, 1942 |
| 2,567,373 | Giacoletto et al. | Sept. 11, 1951 |
| 2,590,168 | Felici | Mar. 25, 1952 |
| 2,649,488 | Harkness | Aug. 18, 1953 |
| 2,737,623 | Charles | Mar. 6, 1956 |

UNITED STATES PATENT OFFICE

CERTIFICATE OF CORRECTION

Patent No. 2,814,660

November 26, 1957

Joseph W. Crownover

It is hereby certified that error appears in the printed specification of the above numbered patent requiring correction and that the said Letters Patent should read as corrected below.

Column 6, line 11, for "spaced 19" read -- spacer 19 --; column 13, line 2, after "plates" insert -- apart --; line 3, strike out "apart".

Signed and sealed this 22nd day of April 1958.

(SEAL)
Attest:

KARL H. AXLINE

Attesting Officer

ROBERT C. WATSON
Commissioner of Patents